US010421621B2

(12) United States Patent
Oono

(10) Patent No.: US 10,421,621 B2
(45) Date of Patent: Sep. 24, 2019

(54) WORK TRANSFERRING SYSTEM AND WORK TRANSFERRING METHOD

(71) Applicant: Fanuc Corporation, Yamanashi (JP)

(72) Inventor: Hajime Oono, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/678,828

(22) Filed: Aug. 16, 2017

(65) Prior Publication Data

US 2018/0057279 A1 Mar. 1, 2018

(30) Foreign Application Priority Data

Aug. 29, 2016 (JP) .................................. 2016-166826

(51) Int. Cl.
| B65G 47/91 | (2006.01) |
| B29C 45/40 | (2006.01) |
| B25J 15/06 | (2006.01) |
| B25J 9/00 | (2006.01) |
| B25J 15/00 | (2006.01) |

(Continued)

(52) U.S. Cl.
CPC ............ B65G 47/91 (2013.01); B25J 9/0093 (2013.01); B25J 15/0052 (2013.01); B25J 15/065 (2013.01); B25J 15/0616 (2013.01); B25J 15/0675 (2013.01); B29C 45/4225 (2013.01); B65G 47/92 (2013.01); B29C 2045/4241 (2013.01)

(58) Field of Classification Search
CPC ..................... B29C 2045/4241; B25J 15/0675
See application file for complete search history.

(56) References Cited

U.S. PATENT DOCUMENTS 5,895,631 A 4/1999 Tajima
2001/0019730 A1* 9/2001 van Manen ............. B29C 45/42
425/547

(Continued)

FOREIGN PATENT DOCUMENTS

CN 103399162 A 11/2013
JP S62-060720 A 3/1987

(Continued)

OTHER PUBLICATIONS

Japan Patent Office, Office Action dated Aug. 21, 2018 for Japan Patent Application No. 2016-166826.

(Continued)

*Primary Examiner* — Gerald McClain
(74) *Attorney, Agent, or Firm* — Winstead PC

(57) ABSTRACT

A work transferring system includes a hand including a body and at least one attracting part configured to hold a work with a gap maintained between the work and a surface of the body by attracting the work to a distal end protruding from the surface; a transfer mechanism configured to transfer the work to a predetermined transfer destination by moving the hand, a work releasing member disposed above the transfer destination to which the transfer mechanism transfers the work and configured to release the work from the attracting part, and a lifting mechanism configured to move up and down the work releasing member or the work. The work releasing member includes a claw arranged in a substantially horizontal cantilever manner and having a shape that allows insertion of the claw into the gap.

5 Claims, 6 Drawing Sheets

(51) Int. Cl.
*B29C 45/42* (2006.01)
*B65G 47/92* (2006.01)

(56) References Cited

U.S. PATENT DOCUMENTS

| | | |
|---|---|---|
| 2002/0123156 A1 | 9/2002 | Tajima |
| 2004/0029260 A1 | 2/2004 | Hansen et al. |
| 2009/0155808 A1 | 6/2009 | Hansen et al. |
| 2011/0200991 A1 | 8/2011 | Hansen et al. |
| 2012/0282603 A1 | 11/2012 | Hansen et al. |

FOREIGN PATENT DOCUMENTS

| | | |
|---|---|---|
| JP | S62-060029 U | 4/1987 |
| JP | H06-155519 A | 6/1994 |
| JP | H06-246668 A | 9/1994 |
| JP | H08-320274 A | 12/1996 |
| JP | H10-221453 A | 8/1998 |
| JP | H11-188677 A | 7/1999 |
| JP | H11-322069 A | 11/1999 |
| JP | 2002-048806 A | 2/2002 |
| JP | 2006-294786 A | 10/2006 |
| JP | 2007-021643 A | 2/2007 |
| JP | 2013-133220 A | 7/2013 |
| JP | 2013-173580 A | 9/2013 |
| JP | 2017-178622 A | 10/2017 |
| WO | WO-03097808 A2 | 11/2003 |

OTHER PUBLICATIONS

Japan Patent Office, Search Report dated Aug. 13, 2018 for Japan Patent Application No. 2016-166826.

\* cited by examiner

WORK TRANSFERRING SYSTEM AND WORK TRANSFERRING METHOD

CROSS-REFERENCE TO RELATED APPLICATIONS

This application is based on and claims priority to Japanese Patent Application No. 2016-166826 filed on Aug. 29, 2016, the entire content of which is incorporated herein by reference.

Technical Field

The present invention relates to a work transferring system and a work transferring method.

Background Art

In a known conventional system of transferring a lightweight minute work such as an injection-molded product, when being transferred, the work is held by attraction with application of negative air pressure by a molded-product picking tool attached to a wrist of a robot (refer to PTL 1, for example).

In such a system, to release the transferred work, the molded-product picking tool typically switches the negative air pressure for holding the work to positive air pressure to blow off the work.

CITATION LIST

Patent Literature

{PTL 1}
Japanese Unexamined Patent Application, Publication No. Hei 6-155519.

SUMMARY OF INVENTION

An aspect of the present invention provides a work transferring system including: a hand including a body and at least one attracting part configured to hold a work with a gap maintained between the work and a surface of the body by attracting the work to a distal end of the attracting part protruding from the surface; a transfer mechanism configured to transfer the work to a predetermined transfer destination by moving the hand; a work releasing member disposed above the transfer destination to which the transfer mechanism transfers the work and configured to release the work from the attracting part; and a lifting mechanism configured to move up and down the work releasing member or the work. The work releasing member includes a claw arranged in a substantially horizontal cantilever manner and having a shape that allows insertion of the claw into the gap.

DESCRIPTION OF EMBODIMENTS

The following describes a work transferring system 1 and a work transferring method according to an embodiment of the present invention with reference to the accompanying drawings.

Figure 1:
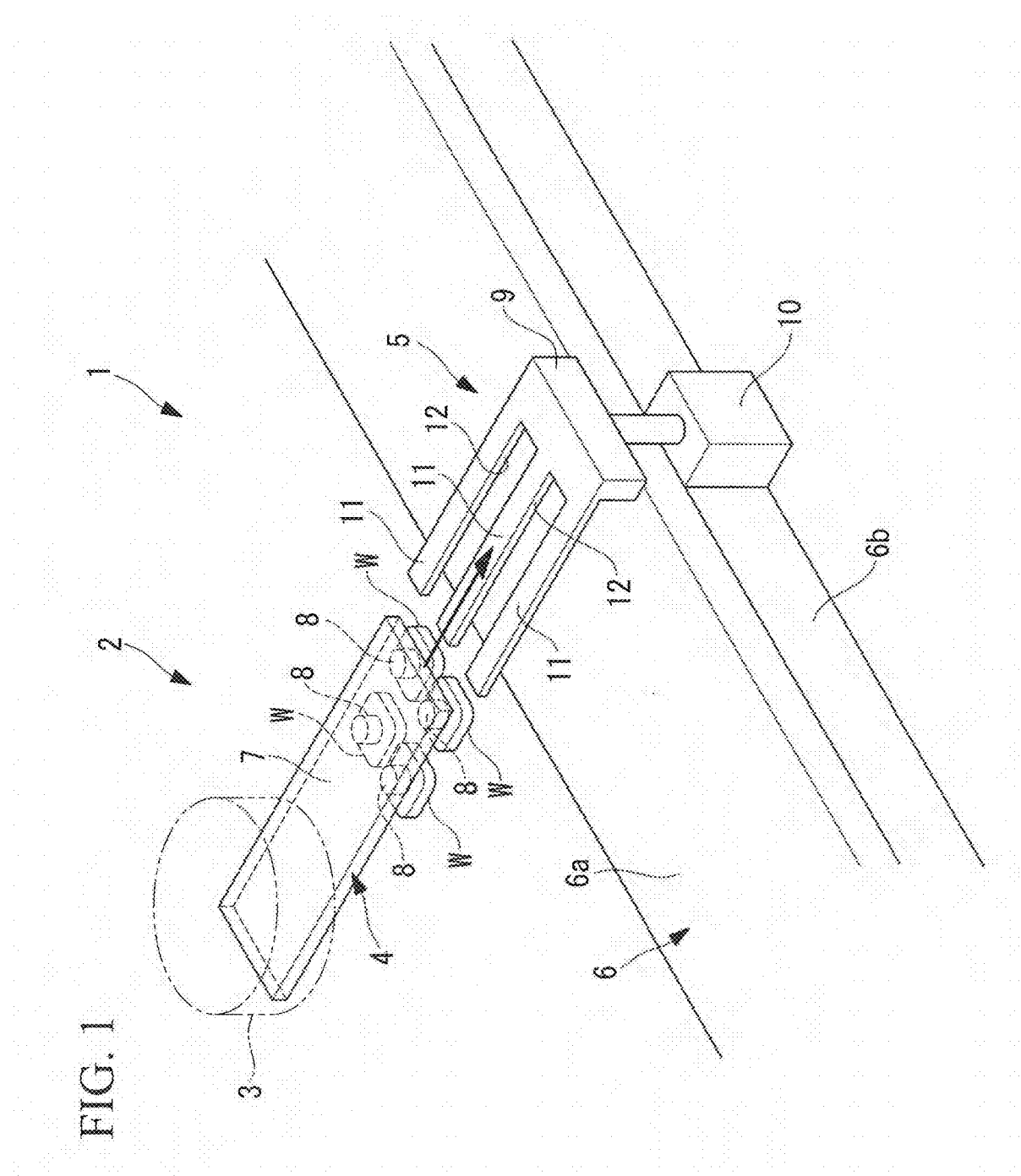
FIG. 1 is a perspective view illustrating part of a work transferring system according to an embodiment of the present invention.

The work transferring system 1 according to the present embodiment is configured to take out works W, such as a molded product by an injection molding machine, from a mold of the injection molding machine and transfer the works W onto a conveyor belt 6 as a transfer destination. As illustrated in FIG. 1, the work transferring system 1 includes a robot (transfer mechanism) 2, a hand 4 attached to a distal end of a wrist of the robot 2 and configured to hold the works W by attraction, and a work releasing unit 5 configured to release from the hand 4, the works W held by the hand 4 by attraction. In FIG. 1, reference sign 6a denotes a belt of the conveyor belt 6, and reference sign 6b denotes a main body of the conveyor belt 6.

Figure 3:
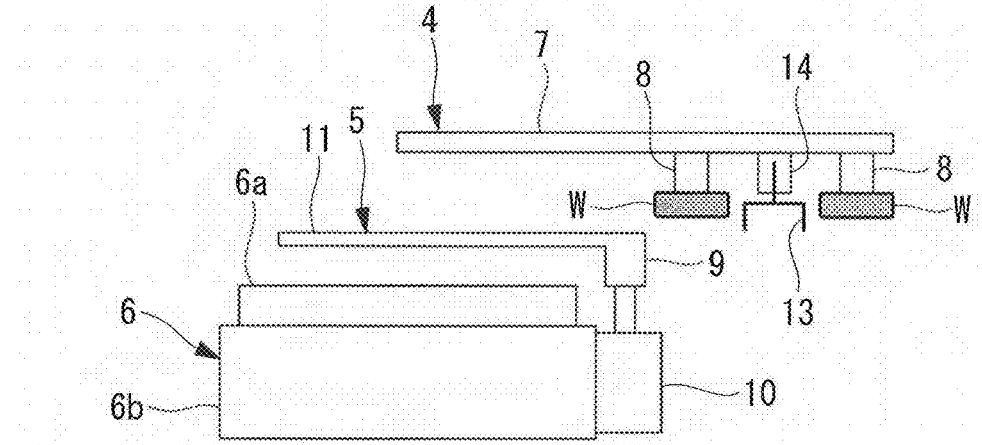
FIG. 3 is a diagram illustrating a first position at which works are attracted to a hand in the work transferring system illustrated in FIG. 1.
Figure 4:
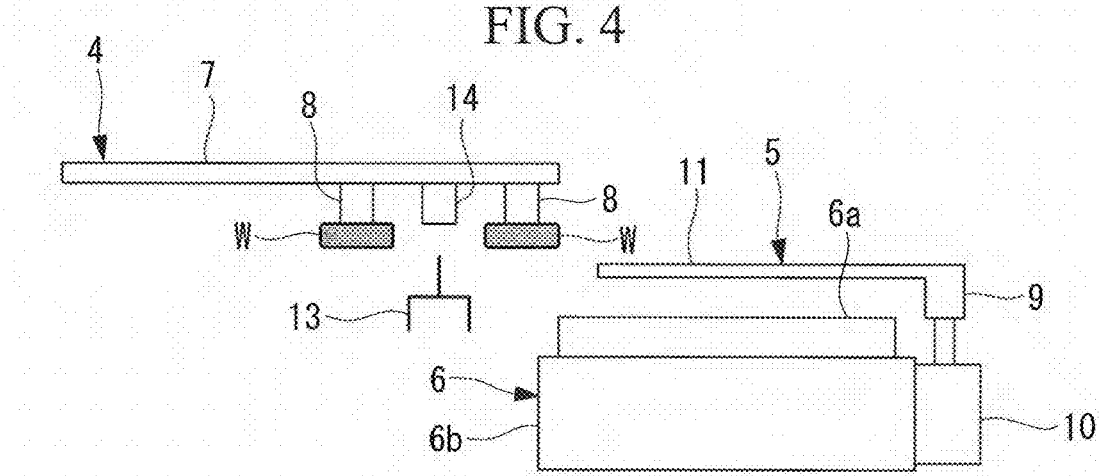
FIG. 4 is a diagram illustrating a second position at which a runner sprue grasped by the hand is discharged in the work transferring system illustrated in FIG. 1.

The robot 2 may have an optional structure and is, for example, a SCARA robot configured to perform fast take out from a mold of the injection molding machine at a high-cycle. FIG. 1 illustrates an end effector 3 of the robot 2 with a dashed-dotted line. The robot 2 has a movable operation range between a first position at which a work W such as a molded product is taken out from a mold of the injection molding machine as illustrated in FIG. 3, and a second position on the opposite side of the first position with respect to the conveyor belt 6 in a width direction thereof as illustrated in FIG. 4.

The hand 4 includes a body 7 having a narrow strip-form plate and attached to the end effector 3 of the robot 2, and a plurality of alignments(for example, four (two in each of two alignments)) of attracting parts 8 protruding from one surface of the body 7. Each attracting part 8 is a cylindrical attracting pad connected to a pipe (not illustrated) to achieve attraction with application of negative pressure inside. With this configuration, a work W in contact with a distal end of the attracting part 8 can be held in an attracted state. The two alignments of the attracting parts 8 are provided in parallel and spaced apart.

The work releasing unit 5 includes, at part of the conveyor belt 6 in a longitudinal direction thereof, a work releasing member 9 disposed above the conveyor belt 6, and an lifting mechanism 10 configured to move up and down the work releasing member 9.

As illustrated in FIG. 1, the work releasing member 9 includes three claws 11 arranged in a substantially horizontal cantilever manner, extending in parallel and spaced apart. The claws 11 are formed in a comb teeth shape with two parallel slits 12 each having an open end at one side and formed with spaces therebetween matching the spaces of the alignments of the attracting parts 8 of the hand 4.

Each claw 11 is formed with a thickness smaller than the height of each attracting part 8 of the hand 4, and each slit 12 is set with a width size larger than the outer diameter of the attracting part 8. With this configuration, the hand 4 in a state attracting the works W to the distal ends of the each attracting part, with the works W being held facing down, is horizontally moved close to the work releasing member 9 through the open ends of the slits 12 while matching the alignments of the attracting parts 8 with the slits 12, so that the attracting parts 8 are inserted into the slits 12, and each claw 11 is inserted into a gap between the one side surface of the body 7 and the works W.

The lifting mechanism 10 is, for example, an air cylinder configured to move up and down the work releasing member 9 between an upper position at which the claws 11 are inserted into the gap between the one surface of the body 7 and the works W, and a lower position at which the claws are moved down from the upper position by a predetermined distance. The upward/downward moving distance of the work releasing member 9 is set to a distance that allows the works W to be pressed downward by the work releasing member 9 to release the attracted state by the attracting part 8 of the works W.

A work transferring method by using the work transferring system 1 according to the present embodiment thus configured will be described below.

Figure 2:
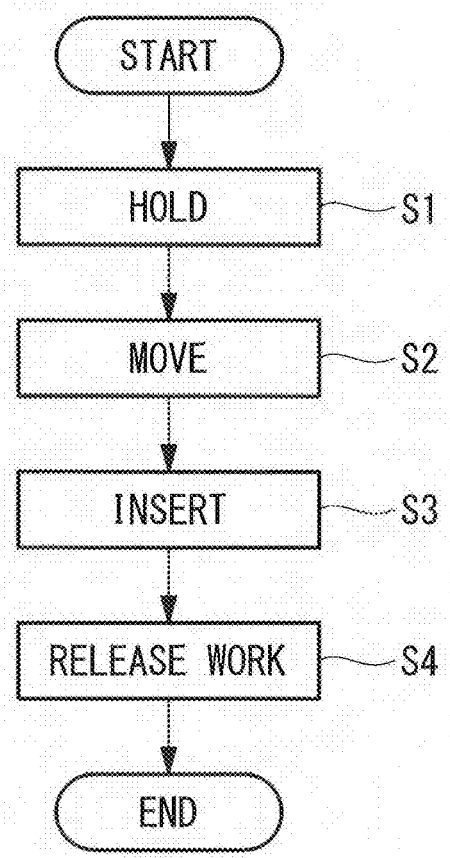
FIG. 2 is a flowchart describing a work transferring method by the work transferring system illustrated in FIG. 1.

As illustrated in FIG. 2, the work transferring method according to the present embodiment includes a holding step S1 for attracting the works W and holding the works W by the hand 4, a moving step S2 for moving the hand 4 holding the works W, an inserting step S3 for inserting the claws 11 into a gap between the body 7 and the works W, and a work releasing step S4 for releasing the works W onto the conveyor belt 6 by moving down the claws 11.

In the holding step S1, the inside of each attracting part 8 provided with a cylindrical attracting pad is depressurized to attract the works W to the distal ends of the attracting parts 8. The four attracting parts 8 (only two of them are illustrated in FIG. 3) can independently depressurize the inside as illustrated in FIG. 3. Since each attracting part 8 protrudes from the body 7 by a predetermined height, the gap equivalent to the height of the attracting part 8 is formed between the work W held at the distal end thereof and the body 7.

In the moving step S2, by operating the robot 2 on which the hand 4 is mounted, the works W attracted to the hand 4 are picked from the injection molding machine and moved to the conveyor belt 6 as a transfer destination.

In the example illustrated in FIGS. 3 to 8, a sprue chuck 14 is provided for grasping a runner sprue 13 in a disconnected state from the works W when the works W are picked from the injection molding machine. As illustrated in FIG. 3, the lifting mechanism 10 is actuated to move down the claws 11 to the lower position. Then, as illustrated in FIG. 4, the robot 2 is actuated to horizontally move the hand 4, onto which the works W are being attracted, to a position on the opposite side of the injection molding machine with respect to the conveyor belt 6 in the width direction thereof, where the runner sprue 13 being grasped by the sprue chuck 14 is discharged.

Figure 5:
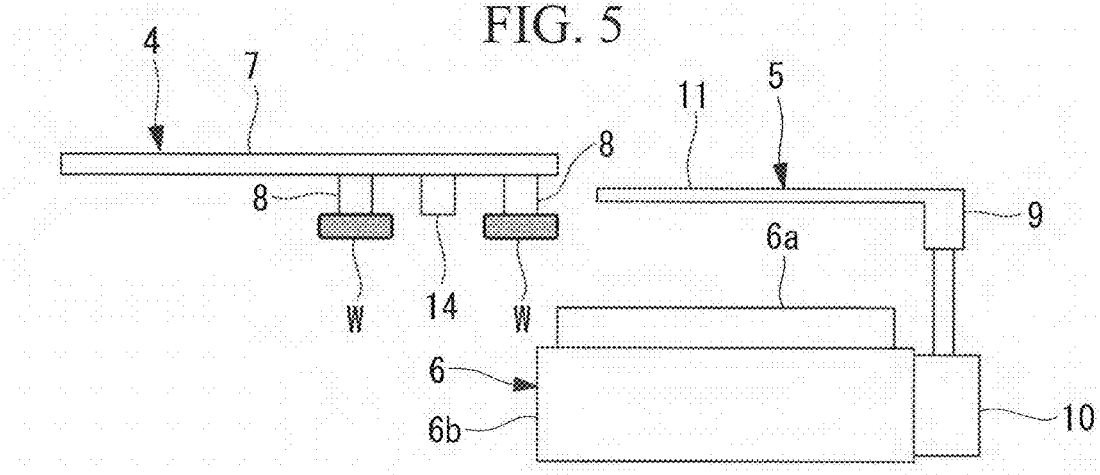
FIG. 5 is a diagram illustrating a state following the state illustrated in FIG. 4, in which a claw is moved up to an upper position by a lifting mechanism.
Figure 6:
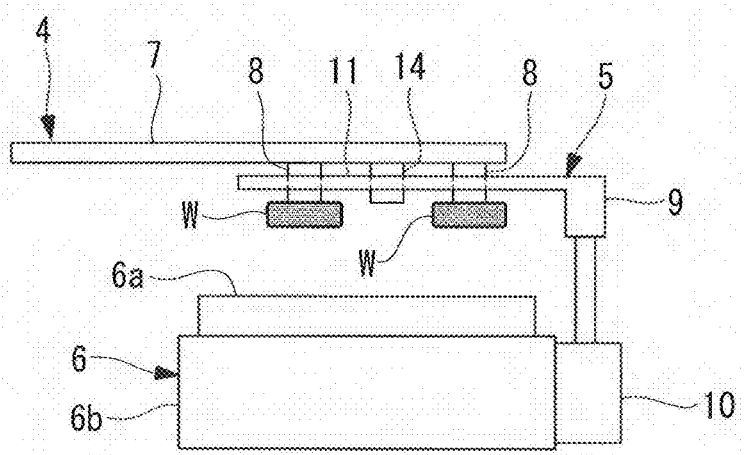
FIG. 6 is a diagram illustrating a state following the state illustrated in FIG. 5, in which the claw is inserted in a gap between a body and the works by horizontally moving the hand.

In the inserting step S3 after the runner sprue 13 is discharged as illustrated in FIG. 4, the lifting mechanism 10 is actuated to move up the claws 11 to the upper position as illustrated in FIG. 5, and then the robot 2 is actuated to horizontally move the hand 4 in a direction returning to the injection molding machine side as illustrated in FIG. 6. Since the claws 11 are placed at the upper position matching the position of the gap between the body 7 of the hand 4 and the works W, the two rows of the aligned attracting parts 8 of the hand 4 are inserted into the two rows of the slits 12, respectively.

Figure 7:
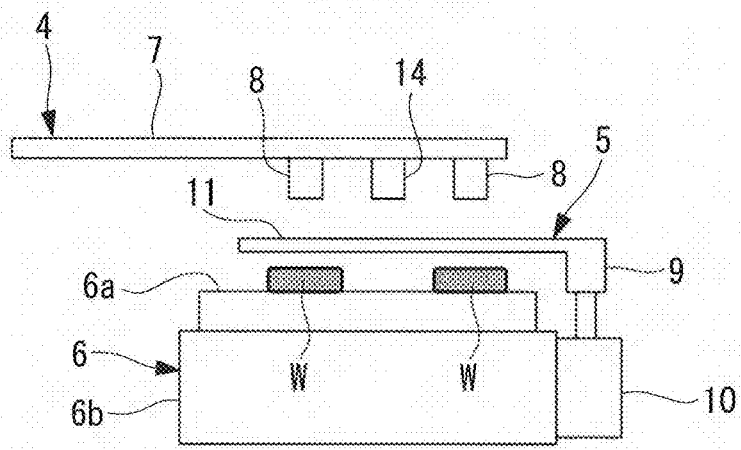
FIG. 7 is a diagram illustrating a state following the state illustrated in FIG. 6, in which the claw is moved down to a lower position by the lifting mechanism to release the works onto the conveyor.
Figure 8:
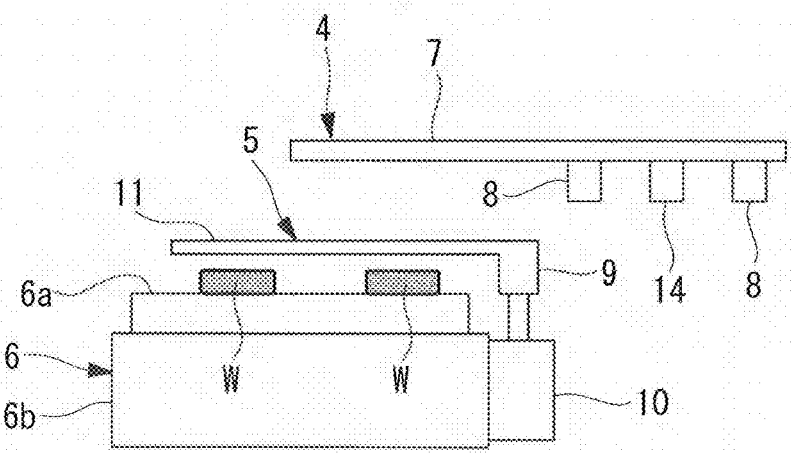
FIG. 8 is a diagram illustrating a state in which the hand having released the works as illustrated in FIG. 7 is returned to the first position.

In the work releasing step S4, the lifting mechanism 10 is actuated to move the claws to the lower position 11 in the position illustrated in FIG. 7, so that the works W are pressed downward by the claws 11 to be released from the attracted state by the attracting part 8, and are released onto the conveyor belt 6 below as illustrated in FIG. 8. Having released the works W, the hand 4 can be horizontally moved directly toward the injection molding machine for next attraction of works W.

As described above, in the work transferring system 1 and the work transferring method according to the present embodiment, since works W are not blown off by positive air pressure when released onto the conveyor belt 6, there is an advantage that even lightweight works W such as minute molded products can be released onto the conveyor belt 6 and to be aligned at a certain level without being scattered. In addition, since the release is not achieved by relaxing attraction, the works W can be swiftly released, which prevents an increase in the takt time.

Further, the example illustrated in FIGS. 9 to 12 describes the case where the runner sprue 13 in a disconnected state from the works W is not grasped when picking the works W from the injection molding machine.

Figure 9:
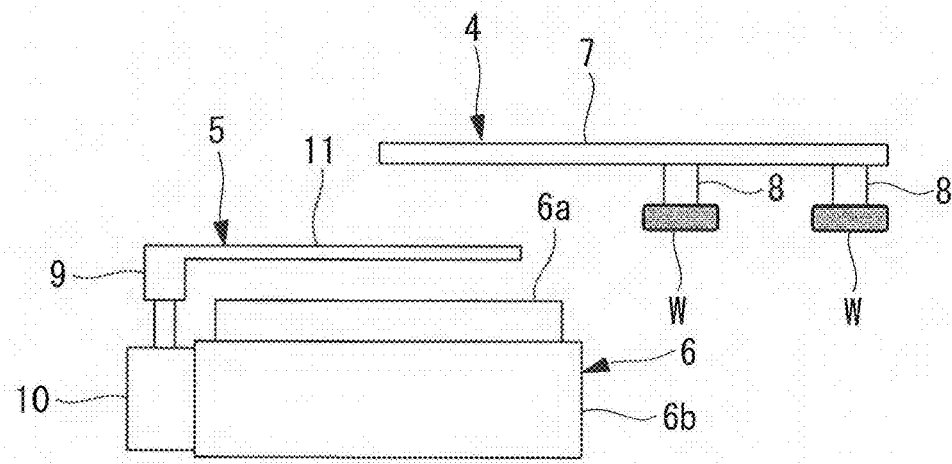
FIG. 9 is a diagram illustrating a first position at which works are attracted to the hand in a modification of the work transferring system illustrated in FIG. 1.
Figure 10:
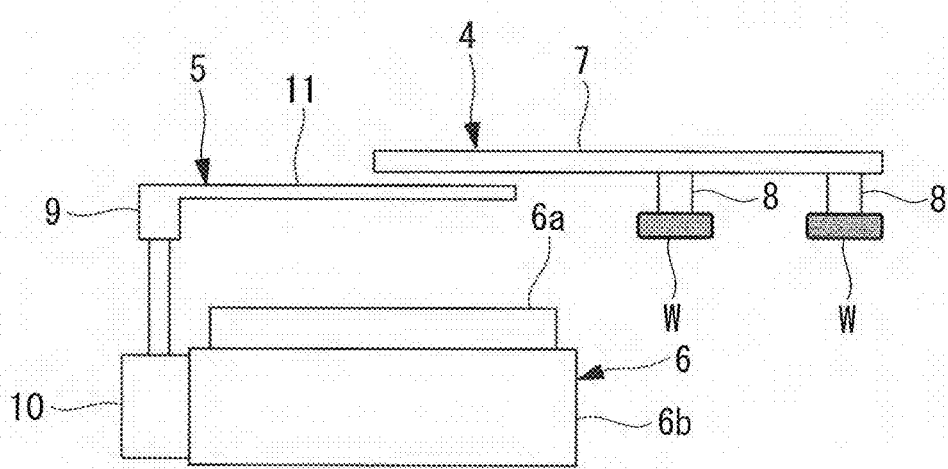
FIG. 10 is a diagram illustrating a state following the state illustrated in FIG. 9, in which the claw is moved up to an upper position by the lifting mechanism.
Figure 11:
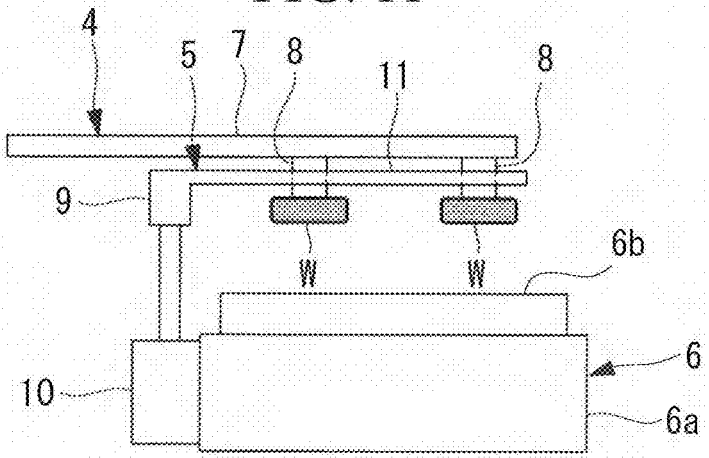
FIG. 11 is a diagram illustrating a state following the state illustrated in FIG. 10, in which the claw is inserted in the gap between the body and the works by horizontally moving the hand.

In this case, it is not necessary to discharge the runner sprue 13. Thus, the slits 12 of the claws 11 can be set in orientations opposite to the above-described orientations. Then, while the hand 4 to which the works W are attracted at the holding step S1 is moved to a position above the conveyor belt 6 as illustrated in FIG. 9, the lifting mechanism 10 is actuated to move up the claws 11 to an upper position as illustrated in FIG. 10. Thereafter, the inserting step S3 of inserting the attracting parts 8 into the slits 12 may be performed as illustrated in FIG. 11.

Figure 12:
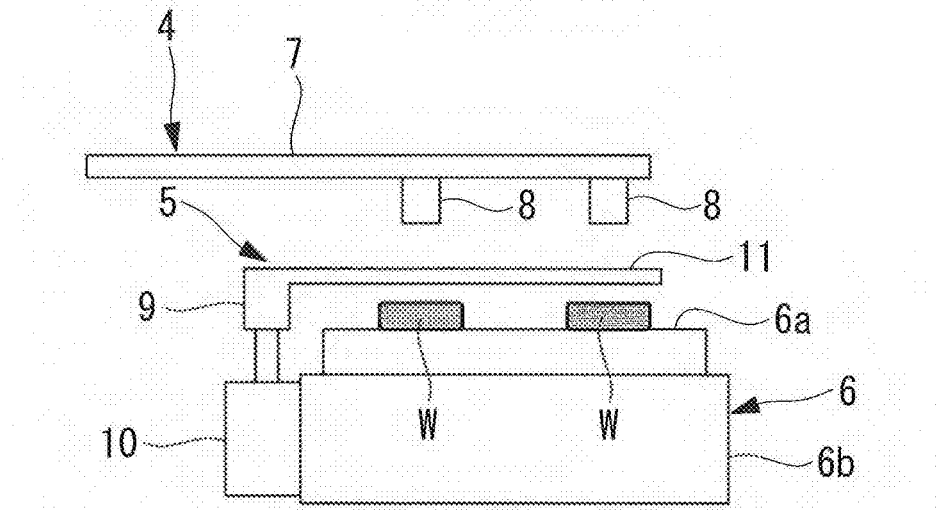
FIG. 12 is a diagram illustrating a state following the state illustrated in FIG. 11, in which the claw is moved down to a lower position by the lifting mechanism to release the works onto the conveyor.
Figure 13:
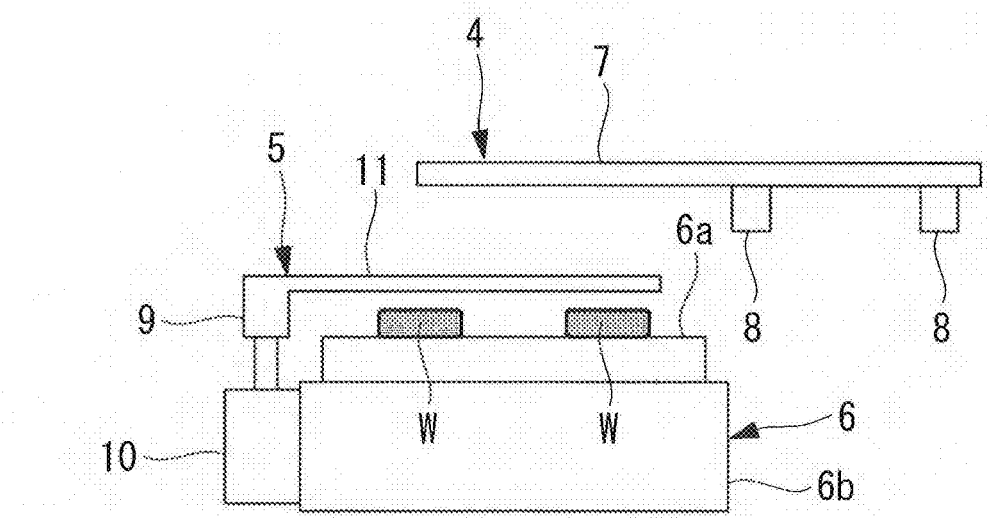
FIG. 13 is a diagram illustrating a state in which the hand having released the works as illustrated in FIG. 12 is returned to the first position.

Then, as illustrated in FIG. 12, the work releasing step S4 for releasing the works W onto the conveyor belt 6 is performed by moving down the claws 11 to a lower position by actuating the lifting mechanism 10. Thereafter, as illustrated in FIG. 13, the hand 4 is moved in a reverse direction, and the process starting at the holding step S1 for next works W may be repeated.

In the present embodiment, each attracting part 8 is configured to attract a work W through a pressure difference generated by depressurizing the inside of the cylindrical attracting pad. Alternatively, when the work W is made of a magnetic material, for the attracting part 8 for attracting the work W by magnetic attraction force, a permanent magnet or an electromagnet, or the like may be adopted.

The conveyor belt 6 is exemplarily illustrated as a transfer destination. However, the transfer destination may be any other conveyance destination, for example, a tray onto which works are required to be released to be aligned at a certain level.

The claw 11 having the two slits 12 have been exemplified above. Alternatively, the claws 11 having a single slit or three or more slits in accordance with the number of rows of the attracting parts 8 provided at the hand 4 may be adopted.

An air cylinder has been exemplarily illustrated as the lifting mechanism 10, but is not limited thereto. High-speed and accurate position control may be performed by combining a servomotor with, for example, a crank mechanism, a cam mechanism, or a ball screw. Such a configuration can achieve improved productivity through high-speed operation and release of the works W in a more accurately aligned state by reducing vibration of the conveyor belt 6 and bouncing of the works W through accurate position control.

The present embodiment exemplarily illustrates the case in which the lifting mechanism 10 is fixed to the conveyor belt 6. However, the lifting mechanism 10 may be disposed independently from the injection molding machine and the conveyor belt 6. This configuration prevents the lifting mechanism 10 from being affected by the vibration of the injection molding machine, and that the conveyor belt 6 side is also not affected by the vibration from moving up and down the claws 11. As a result, there is an advantage that the positions of the works W released onto the conveyor belt 6 are not disturbed.

Commands to instruct the lifting mechanism 10 to move up and down the claws 11 and confirmation signals thereof may be communicated between the robot 2 and a driving unit of the lifting mechanism 10. Alternatively, the lifting mechanism 10 may be driven by a logic controller as a host computer of the robot 2.

The robot 2 as a transfer mechanism is exemplarily illustrated as a SCARA robot, but is not limited thereto.

In the above-described aspect, the claws 11 are moved up by the lifting mechanism 10, inserted into a gap between the body 7 and works W, and then moved down by the lifting mechanism 10 to release attraction so that the works W are released onto the conveyor belt 6 below. However, the claws 11 may be fixed above the conveyor belt 6 at a position spaced apart from the conveyor belt 6. With this configuration, the attraction is released by inserting the claws 11 into the gap between the body 7 and the works W, and then moving up the works W by a lifting mechanism (not illustrated) provided between the hand 4 and the attracting parts 8. In addition, a lifting mechanism may be provided in the robot 2 configuring a transfer mechanism, and the attracted state may be released by moving up its hand 4.

From the above-described embodiments, the following aspects of the present invention are derived.

An aspect of the present invention provides a work transferring system including: a hand including a body and at least one attracting part configured to hold a work with a gap maintained between the work and a surface of the body by attracting the work to a distal end of the attracting part protruding from the surface; a transfer mechanism configured to transfer the work to a predetermined transfer destination by moving the hand; a work releasing member disposed above the transfer destination to which the transfer mechanism transfers the work and configured to release the work from the attracting part; and a lifting mechanism configured to move up and down the work releasing member or the work. The work releasing member includes a claw arranged in a substantially horizontal cantilever manner and having a shape that allows insertion of the claw into the gap.

According to the present aspect, by attracting the work to the distal end of the attracting part protruding from the surface of the body, the work is held by the hand with a gap maintained between the work and the surface of the body and is transferred to the predetermined transfer destination by moving the hand by actuation of the transfer mechanism. Then, at the transfer destination, the hand below which the work is held is moved toward the work releasing member including the claw arranged in a substantially horizontal cantilever manner so that the claw is inserted in the gap between the work and the surface of the body. In this state, the lifting mechanism is actuated to move down the work releasing member or lift up the work so that the work is pressed downward by the claw to be separated from the attracting part and released onto the transfer destination disposed below the claw.

In this case, according to the present aspect, since the work attracted to the attracting part is not blown off by the positive air pressure when releasing the work to the transfer destination, even if the work is lightweight and minute, the works are not scattered by air pressure and hence can be released to the transfer destination to be aligned at a certain level. In addition, unlike the case in which the work is released by weakening the attraction by the attracting part, the attracted work is scraped off by the claw which allows more reliable release of the work in a short time, thereby achieving improved productivity.

In the above-described aspect, the claw may include a slit having a width that allows insertion of the attracting part into the slit.

With this configuration, when the claw is inserted into the gap between the surface of the body and the work, the attracting part is accommodated in the slit provided at the claw, so that by moving down the claw, the work is pressed downward by the claw on both sides of the attracting part, and thus can be more reliably released from attracted state by the attracting part.

In the above-described aspect, the attracting parts may be provided in two or more parallel alignments spaced apart, and the slits may be provided in two or more parallel alignments spaced apart.

With this configuration, a large number of works can be separated from the hand all at once and released to a predetermined transfer destination to be aligned at a certain level, thereby achieving further improved productivity.

Another aspect of the present invention provides a work transferring method including: a holding step of holding a work with a gap maintained between the work and a surface of a hand by attracting the work to a distal end of a attracting part protruding from the surface; a moving step of moving the hand so that the work held by the holding step is placed below the hand at a transfer destination; an inserting step of inserting, into the gap by the movement of the hand, a claw arranged in a substantially horizontal cantilever manner and disposed above the transfer destination; and a work releasing step of releasing the work from the attracting part by pressing the work downward with the claw by moving down the claw or lifting up the work.

According to the aforementioned aspects, lightweight and minute works can be reliably released to be aligned at a certain level in a short time.

REFERENCE SIGNS LIST 1 work transferring system
2 robot (transfer mechanism)
4 hand
6 conveyor belt (transfer destination)
7 body
8 attracting part
9 work releasing member
10 lifting mechanism
11 claw
12 slit
W work
S1 holding step
S2 moving step
S3 inserting step
S4 work releasing step

The invention claimed is:

1. A work transferring system comprising:
a hand main body;
a cylindrical attracting pad provided in the hand main body and protruding from a surface of the hand main body;
an articulated robot to which the hand main body is attached at a distal end portion of the articulated robot and configured to transfer the work attracted by the attracting pad to a predetermined transfer destination by moving the hand main body;
a work releasing member disposed above the transfer destination to which the articulated robot transfers the work and configured to release the work from the attracting pad;
a lifting mechanism which supports the work releasing member so that the work releasing member is disposed above the transfer destination, the lifting mechanism capable of moving the work releasing member in a vertical direction; and
wherein the work releasing member includes a claw arranged in a substantially horizontal cantilever manner, and the claw is inserted into a gap between the surface of the hand main body and the work when the attracting pad, which is attracting the work, is disposed above the transfer destination by the articulated robot, which inserts the claw into the gap between the surface and the work by moving the hand main body along a horizontal axis.

2. The work transferring system according to claim 1, wherein the claw includes a slit having a width that allows insertion of the attracting pad into the slit.

3. The work transferring system according to claim 2, wherein:
a plurality of attracting pads are provided in two or more parallel alignments spaced apart; and
the slits are provided in two or more parallel alignments spaced apart.

4. A work transferring system comprising:
a hand main body;
a cylindrical attracting pad provided in the hand main body and protruding from a surface of the hand main body;
an articulated robot to which the hand main body is attached at a distal end portion of the articulated robot and configured to transfer the work attracted by the attracting pad to a predetermined transfer destination by moving the hand main body;
a work releasing member disposed above the transfer destination to which the articulated robot transfers the work and configured to release the work from the attracting pad;
a lifting mechanism which supports the work releasing member so that the work releasing member is disposed above the transfer destination, the lifting mechanism capable of moving the work releasing member in a vertical direction;
wherein the work releasing member includes a claw arranged in a substantially horizontal cantilever manner;
wherein the claw includes comb-teeth claws forming a slit therebetween; and
wherein the comb-teeth claws are each inserted into the gap between the surface of the hand main body and the work when the attracting pad is disposed above the transfer destination by the articulated robot, a constant relative distance between the comb-teeth claws being maintained while the comb-teeth claws are being inserted.

5. The work transferring system according to claim 4, wherein:
a plurality of cylindrical attracting pads are provided in two or more parallel alignments spaced apart; and
slits are provided in two or more parallel alignments spaced apart.

* * * * *